United States Patent [19]

Oshima et al.

[11] Patent Number: 4,976,526

[45] Date of Patent: Dec. 11, 1990

[54] PERFORMANCE CORRECTING OPTICAL ASSEMBLY FOR PHOTOGRAPHIC LENS FOR TELEVISION

[75] Inventors: Shigeru Oshima, Kanagawa; Kunio Takeshi, Tokyo, both of Japan

[73] Assignee: Canon Kabushiki Kaisha, Tokyo, Japan

[21] Appl. No.: 329,863

[22] Filed: Mar. 28, 1989

[30] Foreign Application Priority Data

Mar. 30, 1988 [JP] Japan .................................. 63-77537
Mar. 30, 1988 [JP] Japan .................................. 63-77538

[51] Int. Cl.$^5$ ............................................. G02B 9/64
[52] U.S. Cl. ........................................ 350/463; 350/483
[58] Field of Search ................................ 350/463, 483

[56] References Cited

U.S. PATENT DOCUMENTS 61,812 2/1867 Dallmeyer .......................... 350/483

FOREIGN PATENT DOCUMENTS 0620925 8/1978 U.S.S.R. ............................. 350/463

Primary Examiner—Bruce Y. Arnold
Assistant Examiner—Rebecca D. Gass
Attorney, Agent, or Firm—Fitzpatrick, Cella, Harper & Scinto

[57] ABSTRACT

A chromatic aberration correcting lens assembly arranged on the image side of a photographic lens which is used in combination with a prism of a predetermined thickness on the image side thereof to correct the chromatic aberrations of the entire system, is constructed in the form of an assembly of three lens elements made of at least two different materials and cemented together at their adjoining surfaces, each of the cemented surfaces being made concave toward the image side.

15 Claims, 8 Drawing Sheets

PERFORMANCE CORRECTING OPTICAL ASSEMBLY FOR PHOTOGRAPHIC LENS FOR TELEVISION

BACKGROUND OF THE INVENTION

1. Field of the Invention

This invention relates to chromatic aberration correcting elements for optical assemblies usable in television (video) cameras. As the photographic lens for a television camera is designed to be used in combination with a prism, (for example, a color separation prism of a specified medium of certain thickness on the image side of the photographic lens 0, when the prism in use has a different thickness or is composed of a different medium from the designed one, the chromatic aberration varies. Hence, the present invention relates to a chromatic aberration correcting element for use in such a photographic lens on the image side thereof to compensate for the variation of the chromatic aberration.

2. Description of the Related Art

The color television camera is conventionally equipped with a plurality of image pickup elements for 2 or 3 primary colors (R, G, B) to which polychromatic light from the photographic lens is conducted through a color separation (image separation) prism for the 2 or 3 primary colors. The photographic lens to be used in the color television camera is, therefore, designed in such a way that good correction of all image aberrations is established only when the color separation prism arranged on the image side of the lens is of a specified medium with a predetermined thickness.

For this reason, if a color separation prism which is different in medium and thickness from the designed one is used, large chromatic aberrations are produced, becoming a cause for lowering the image quality.

Suppose the color separation prism for which the aberration correction of a photographic lens has been attained is made of an optical glass, for example, of BK7 in the Schott catalogue, whose property is nd=1.51633, νd=64.1 with a thickness of 65 mm. Then if a color separation prism comprised of a prism element of F5(nd=1.60342, νd=38.0) 30 mm thick and another prism element of BK7 20 mm thick is attached instead, the inconsistency in material and prism length will result in the production of large chromatic aberrations, particularly longitudinal chromatic aberration or spherical aberration.

The spherical aberration can be corrected relatively easily by inserting a parallel flat glass to adjust the length of the optical path of the prism to the design value, as disclosed in Japanese Laid-Open Utility Model Application No. Sho 57-71313.

The longitudinal chromatic aberration is, on the other hand, difficult to correct when the parallel flat glass only is inserted. In a case where the BK7 correction lens is combined with the F5 prism through a 15 mm thick parallel flat glass of BK7, the blue image is focused as displaced from the position equivalent to the green image in a direction of going away from the lens, while the red image is focused as displaced relative to the green image toward the lens. By representation in terms of Fraunhofer lines, the g-line (436 nm) displaces 107 microns with respect to the d-line (588 nm), and the c-line (656 nm) displaces −22 microns with respect to the d-line.

The photographic lens for a television camera is designed in a form near to the so-called telecentric form with the exit pupil at infinity for the purpose of preventing the occurrence of color shading due to the change of the angle of incidence of light on the dichroic layers of the color separation prism. From this reason, even if the material of the prism in use is different from the designed one, it is only the longitudinal chromatic aberration that suffers a change, but the lateral chromatic aberration scarcely changes.

In the case of using a set of image pickup tubes as the image pickup means, because of their being axially movable, even if the photographic lens is left having some residual longitudinal chromatic aberration, the compensation for this could be accomplished by adjusting the positions of the image pickup tubes for the different colors individually to provide respective sharp focuses.

In recent years, however, an increasing number of color television cameras have employed a set of solid state image pickup elements in fixedly secured relation to the prism. In this case, because the possibility of adjusting the positions of the image pickup elements is no longer available, if a photographic lens of different compensation for the prism is attached, the longitudinal chromatic aberration collapses, giving rise to a problem of the so-called tracking error.

This phenomenon cannot be obviated even if the prism material is the same as the assumed material, since it takes place in a case where the standard wavelengths for the three primary colors R, G and B are different from the designed ones, or where the amount of primary chromatic aberration differs.

For example, a camera A is assumed to have a prism length of 65 mm with the R-channel and B-channel CCDs in different positions respectively by +5 microns and +30 microns relative to the G-channel CCD. Another camera B is assumed to have a prism length of 60 mm with the R-channel and B-channel CCDs in different positions each by +15 microns relative to the G-channel CCD. Suppose the photographic lens corrected for longitudinal chromatic aberration with respect to the camera A is attached to the camera B, then the use of only the 5 mm thick parallel flat glass does not suffice for matching the longitudinal chromatic aberration. For this reason, a tracking error occurs.

SUMMARY OF THE INVENTION

An object of the present invention is to provide a possibility that, with a camera body having a different prism from the prism presumed in the design of a photographic lens, even when this photographic lens is attached to the camera body, the image quality is not caused to deteriorate.

DETAILED DESCRIPTION OF THE PREFERRED EMBODIMENTS

Figure 1:
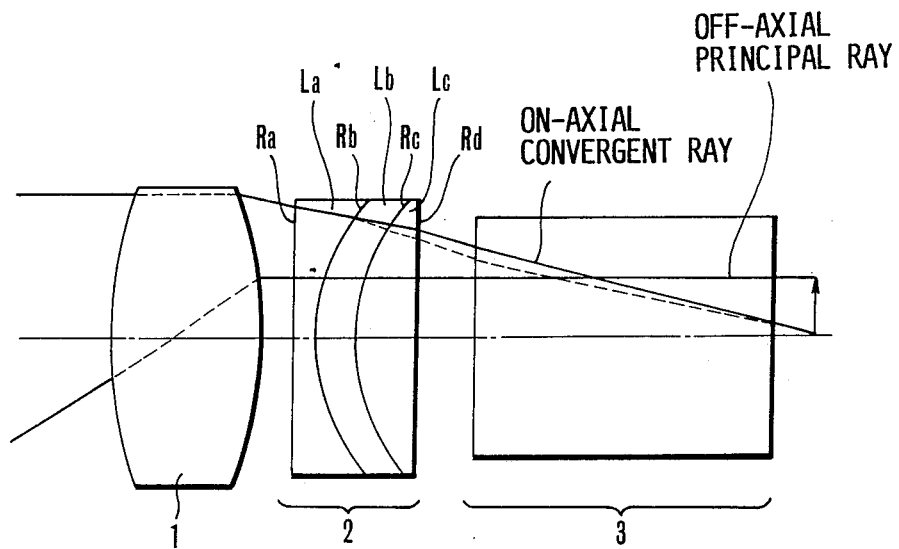
FIG. 1 is a schematic diagram of an optical system of an embodiment of the invention as applied to the photographic system of a television camera.

FIG. 1 is a schematic diagram of the optical system of one embodiment of the invention as applied to the photographic system for a television camera.

In FIG. 1, reference numeral 1 represents a photographic lens of the monofocal or zoom type virtually in a form approximate to the telecentric optics, followed by a chromatic aberration correcting lens 2 with which the invention has concern. A color separation prism for 2 or 3 primary colors is shown by an equivalent block 3.

The chromatic aberration correcting lens 2 is constructed with three lenses La, Lb and Lc cemented together at their adjoining surfaces to form a cemented triplet. Of these, the lens La and the lens Lc are made of the same material. In other words, their Abbe numbers $va$ and $vc$ have the same value, and their refractive indices $na$ and $nc$ also have the same value. The other lens Lb is made of a material whose refractive index $nb$ is almost equal to that of the material of the lenses La and Lc, but whose Abbe number $vb$ is smaller than the Abbe numbers $va$ and $vc$ of the lenses La and Lc. Abbe number of glass is the reciprocal of its dispersion.

For these three lenses, the relationships that their materials should satisfy in Abbe number and refractive index are set forth as follows:

$$na \approx nb \approx nc$$

$$v \approx vc > vb$$

Also, the first lens surface Ra and the last lens surface Rd of the chromatic aberration correcting lens 2 in this embodiment are made flat for the purpose of simplicity, and the cemented surfaces Rb and Rc are formed with almost equal curvatures with respect to each other. These cemented surfaces each are arranged to turn their concave curvatures toward the image side.

The chromatic aberration correcting lens 2 in this embodiment, because, with regard to the spectral d-line, the refractive indices of the materials of the three lenses La, Lb and Lc are almost equal to one another, functions as the parallel flat glass. That is, it provides the function of correcting the spherical aberration.

Meanwhile, with regard to the spectral g-line which is shorter in wavelength than the d-line, the cemented lens surface Rb exerts a positive refractive power, while the cemented surface Rc exerts a negative refractive power. The off-axial principal ray travels almost in parallel to the optical axis, because the photographic lens 1 is nearly of the telecentric form. For this reason, its heights of incidence on the cemented lens surfaces Rb and Rc become almost equal to each other. As a result, the negative and positive refractive powers are canceled out, having no influence on the lateral chromatic aberration.

The on-axial ray which is to converge onto the optical axis, on the other hand, is incident on the cemented lens surfaces Rb and Rc at different heights Hc and Hc, where $Hb > Hc$. The longitudinal chromatic aberration of a ray at a height of incidence h on a lens having a refractive power $\phi$ and an Abbe number $v$ is expressed by $h^2 \cdot \phi / v$. Hence, it is proportional to the square of the height of incidence h. For this reason, the cemented lens surface Rb contributes to a greater action. Because the lens 2 as a whole functions as a lens of positive power, the position of the focus of the spectral g-line is shifted toward the lens, thus making it possible to cancel the displacement of the image by the F5 prism 3.

It should be noted that the heights of incidence of the off-axial principal ray on the cemented lens surfaces Rb and Rc, in some case, take different values Hb' and Hc' because of the thickness of the lens Lb. For this case, if $Hb' < Hc'$, the lateral chromatic aberration comes to more or less change. On this account, the cemented lens surfaces should be configured to the radii of curvature Rb and Rc as set forth as follows:

$$|Rb| > |Rc|$$

When this relationship is satisfied, the change of the lateral chromatic aberration can be corrected well.

In such a manner, both of the lateral chromatic aberration and the longitudinal chromatic aberration are corrected in good balance by means of, in this embodiment, configuring the front cemented lens surface Rb so as to effect the result of under-achromatism and the rear cemented lens surface Rc to effect the result of over-achromatism, and utilizing the difference between the heights of incidence of the on-axial ray and the off-axial principal ray.

Another advantage arising from setting forth the cemented lens surfaces each in concave form toward the image side is that correction of the chromatic aberrations is made effective and the chromatic variation of the spherical aberration is corrected well. For the purpose of confirmation, if the middle lens Lb is made bi-convex, the Abbe numbers $va$, $vb$ and $vc$ of the materials of the three lenses must satisfy $va > vb > vc$. This leads to a limitation of the range of glasses to be chosen. If many glass types are available, a good choice will be available. Otherwise, it is better to construct the middle lens Lb in meniscus form as in the illustrated embodiment.

Though this embodiment has been described, for the purpose of simplicity, in connection with a case where the refractive indices $na$, $nb$ and $nc$ of the materials of the three lenses are $na \approx nb \approx nc$, it is to be understood that the refractive indices of the materials of the three lenses do not always have to be equal to one another. All of them may otherwise be made up of different materials.

For example, the refractive index $nb$ of the material of the middle lens Lb may be made higher than the refractive indices of the materials of the other lenses La and Lc. If this modification is used, it becomes easy to set the ratio of the Abbe numbers $vb$ and $va$, or $vb$ and $vc$ up to as large a value as 2 or thereabout. This permits a further improvement of the correction of chromatic aberrations to be achieved. It should be noted that the introduction of the refractive index difference causes production of spherical aberration at the cemented surfaces. Yet, this increase of spherical aberration, when causing the image quality to lower largely, can be obviated when a choice of materials for the lenses La and Lc with respect to the refractive index is made as na≈nc. In this case, the front cemented lens surface Rb and the rear cemented lens surface Rc produce spherical aberrations which can cancel each other.

Another example of modification of this embodiment is that a weak refractive power is imparted to at least one of the first lens surface Ra and the last lens surface Rd of the chromatic aberration correcting lens 2 to thereby either correct various aberrations produced from the cemented lens surfaces, or control the overall refractive power as a chromatic aberration correcting lens.

It is also to be noted that if the photographic lens corrected for the prism of small Abbe number material is to be used in combination with a large Abbe number prism, materials for the three lenses constituting the chromatic aberration correcting lens should be chosen in the reverse order of the magnitudes of their Abbe numbers to that described above, when the invention is applied to effect an equivalent result.

A numerical example 1 of the invention is shown in a table below where Ri is the radius of curvature of the i-th lens surface counting from the front, Di is the i-th lens thickness or air separation counting from the front, and Ni and $v_i$ are respectively the refractive index and Abbe number of the glass of the i-th lens element counting from the front.

| Numerical Example 1 | | | |
|---|---|---|---|
| F = 9.30 − 118 FNo = 1:1.6 − 1.7 | | | |
| R1 = −2337.70 | D1 = 2.50 | N1 = 1.80518 | v1 = 25.4 |
| R2 = 107.51 | D2 = 3.84 | | |
| R3 = 330.35 | D3 = 8.40 | N2 = 1.43387 | v2 = 95.1 |
| R4 = −123.70 | D4 = 0.15 | | |
| R5 = 181.98 | D5 = 8.36 | N3 = 1.49700 | v3 = 81.6 |
| R6 = −158.76 | D6 = 0.15 | | |
| R7 = 52.34 | D7 = 10.76 | N4 = 1.69680 | v4 = 55.5 |
| R8 = 237.88 | D8 = Variable | | |
| R9 = 61.10 | D9 = 1.00 | N5 = 1.88300 | v5 = 40.8 |
| R10 = 18.77 | D10 = 3.80 | | |
| R11 = −63.98 | D11 = 0.80 | N6 = 1.80400 | v6 = 46.6 |
| R12 = 82.33 | D12 = 3.76 | | |
| R13 = −16.14 | D13 = 0.80 | N7 = 1.77250 | v7 = 49.6 |
| R14 = 307.48 | D14 = 3.20 | N8 = 1.92286 | v8 = 21.3 |
| R15 = −28.88 | D15 = Variable | | |
| R16 = −26.20 | D16 = 0.90 | N9 = 1.77250 | v9 = 49.6 |
| R17 = 29.28 | D17 = 3.70 | N10 = 1.92286 | v10 = 21.3 |
| R18 = −786.13 | D18 = Variable | | |
| R19 = −160.22 | D19 = 3.88 | N11 = 1.58144 | v11 = 40.7 |
| R20 = −35.70 | D20 = 0.15 | | |
| R21 = 82.00 | D21 = 10.11 | N12 = 1.56732 | v12 = 42.8 |
| R22 = −21.91 | D22 = 1.20 | N13 = 1.88300 | v13 = 40.8 |
| R23 = −73.59 | D23 = 14.87 | | |
| R24 = 65.40 | D24 = 9.55 | N14 = 1.51112 | v14 = 60.5 |
| R25 = −57.48 | D25 = 0.15 | | |
| R26 = −1739.44 | D26 = 1.20 | N15 = 1.88300 | v15 = 40.8 |
| R27 = 37.25 | D27 = 10.97 | N16 = 1.50048 | v16 = 65.9 |
| R28 = −64.96 | D28 = 0.15 | | |
| R29 = 10851.00 | D29 = 1.20 | N17 = 1.83400 | v17 = 37.2 |
| R30 = 32.11 | D30 = 9.89 | N18 = 1.48749 | v18 = 70.2 |
| R31 = −87.01 | D31 = 0.15 | | |
| R32 = 38.76 | D32 = 9.25 | N19 = 1.48749 | v19 = 70.2 |
| R33 = 121.00 | D33 = 5.00 | | |
| R34 = ∞ | D34 = 2.00 | N20 = 1.62041 | v20 = 60.3 |
| R35 = 26.20 | D35 = 5.00 | N21 = 1.71736 | v21 = 29.5 |
| R36 = 25.00 | D36 = 8.00 | N22 = 1.62041 | v22 = 60.3 |
| R37 = ∞ | D37 = 5.00 | | |
| R38 = ∞ | D38 = 30.00 | N23 = 1.60342 | v23 = 38.0 |
| R39 = ∞ | D39 = 20.00 | N24 = 1.51633 | v24 = 64.1 |
| R40 = ∞ | | | |

| Numerical Example 1 | | |
|---|---|---|
| Lens Separations during zooming | | |
| Focal Length | D8 | D15 | D18 |
| 9.3 | 0.6 | 44.39 | 5.24 |
| 118 | 44.14 | 2.71 | 3.38 |

Figure 2:
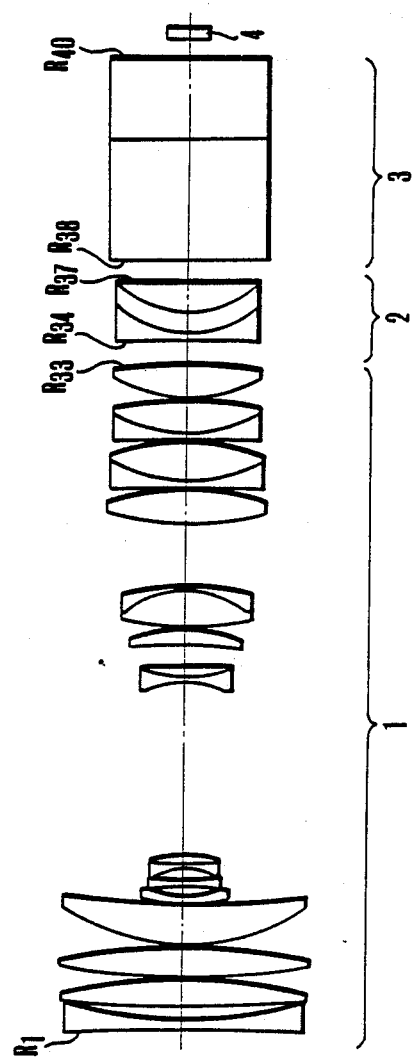
FIG. 2 and FIG. 3 are a longitudinal section view and aberration curves of a numerical example 1 of optics as obtained by applying the invention to a zoom lens.
Figure 3:
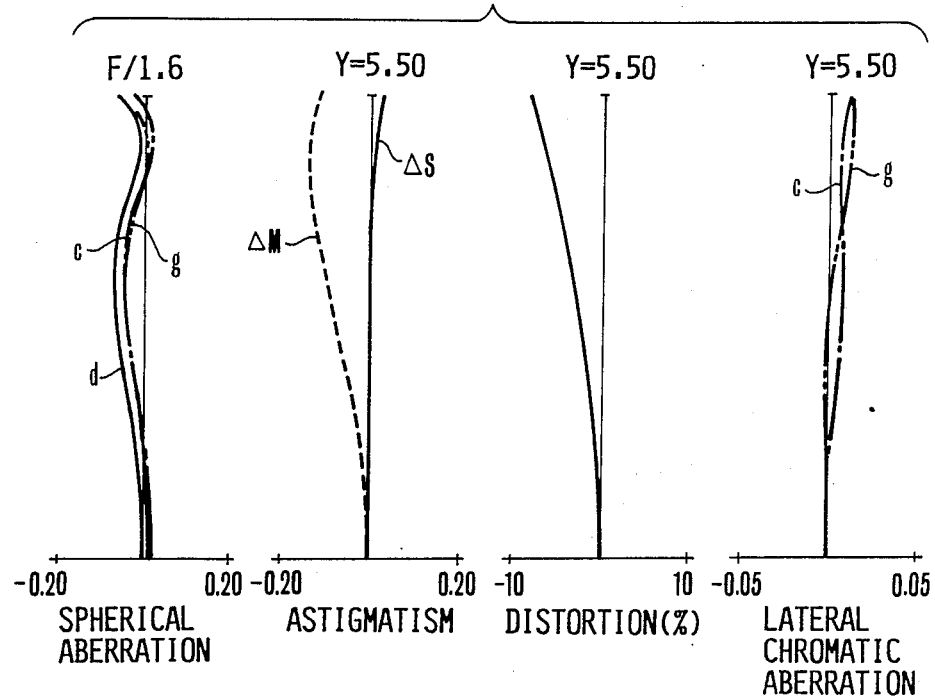
Figure 4:
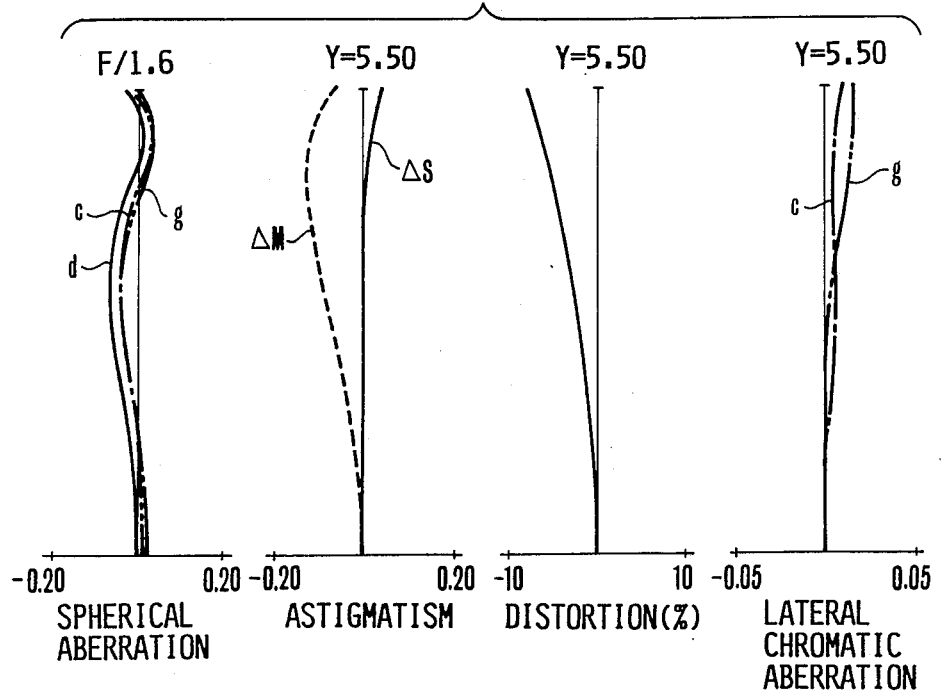
FIG. 4 comprises aberration curves of other optics as obtained by having the zoom lens of the numerical example 1 associated with the original prism.

In the numerical example 1, R1 to R33 define a zoom lens designed with a BK-7 prism of 65 mm thickness on the image side thereof. R34 to R37 define a chromatic aberration correcting lens according to the invention. R38 to R40 are a block equivalent to a F5 prism. FIG. 2 and FIG. 3 are a lens block diagram and a graphic representation of the aberrations in the wide angle end of the numerical example 1, respectively. In FIG. 2, reference numeral 4 represents one of the solid state image pickup elements. For reference, a variation of the numerical example 1 by adopting the normal or BK-7, 65 mm thick prism for which the zoom lens is originally designed instead of the F5 prism has aberrations shown in FIG. 4.

Another numerical example 2 of the chromatic aberration correcting lens (R34 to R37) and the F5 prism (R38 to R40) for use on the image side of the zoom lens shown in the numerical example 1 is shown below.

| Numerical Example 2 | | | |
|---|---|---|---|
| R34 = 3000.00 | D34 = 1.5 | N20 = 1.48749 | v20 = 70.2 |
| R35 = 24.30 | D35 = 5.0 | N21 = 1.72825 | v21 = 28.5 |
| R36 = 22.00 | D36 = 8.5 | N22 = 1.48749 | v22 = 70.2 |
| R37 = ∞ | D37 = 5.0 | | |
| R38 = ∞ | D38 = 30.0 | N23 = 1.60342 | v23 = 38.0 |
| R39 = ∞ | D39 = 20.0 | N24 = 1.51633 | v24 = 64.1 |
| R40 = ∞ | | | |

Figure 5:
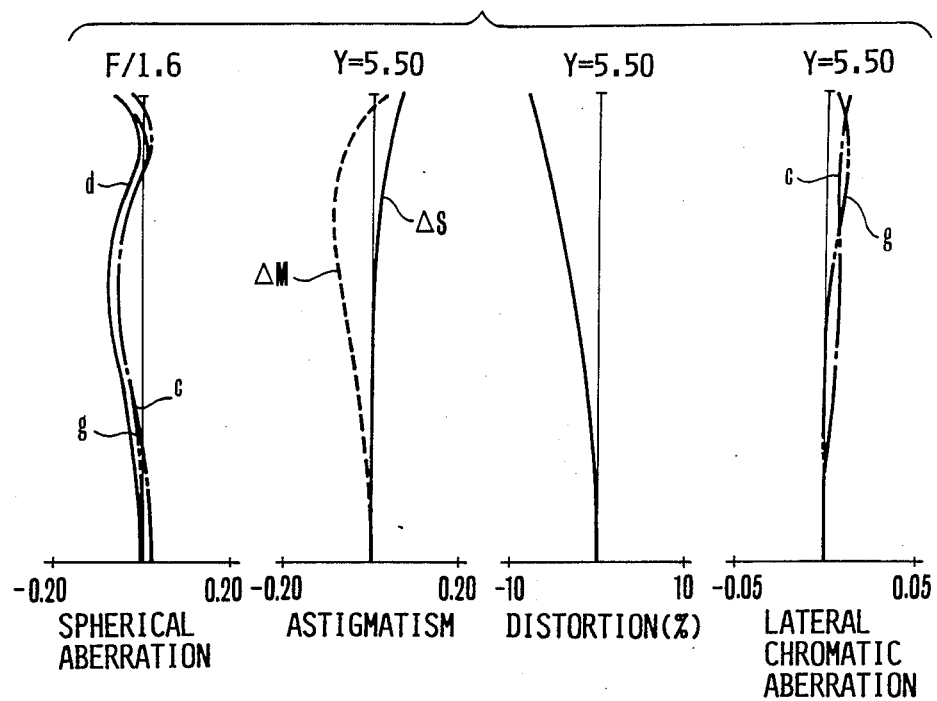
FIG. 5 comprises aberration curves of a numerical example 2 of optics as obtained by applying the invention to the zoom lens.

In this example, the ratios of the Abbe numbers of the cemented lens, va/vb and vc/vb, are made large, being "2" and "46", respectively, and the refractive index differences also are taken at large values, to achieve good correction of chromatic aberrations over the entire area of the image plane. The aberrations of the optical system employing the numerical example 2 in the wide angle end are shown in FIG. 5.

Figure 6:
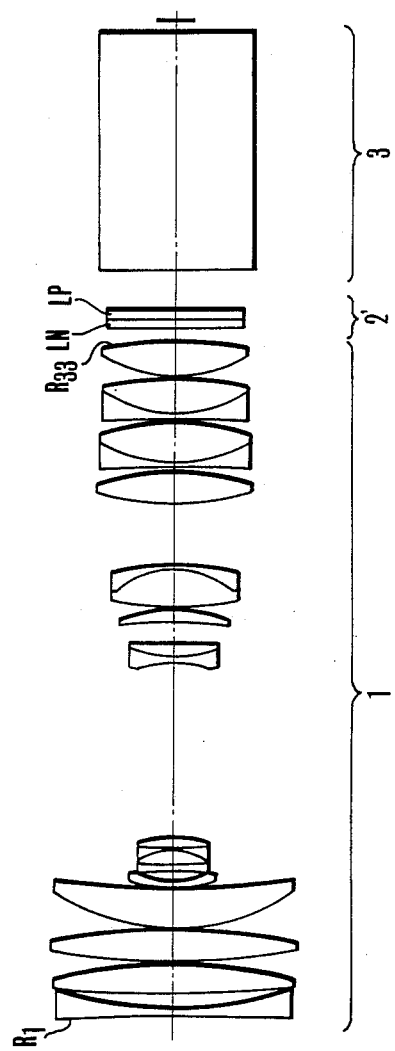
FIG. 6 is a block diagram of an optical system of another embodiment.

FIG. 6 is a schematic diagram of the optical system of another embodiment of the invention as applied to the photographic system for a television camera. In FIG. 6, reference numeral 1 denotes a photographic lens comprising an optical system nearly like the telecentric one such as the zoom lens. A chromatic aberration correcting lens according to the invention is indicated at 2'. A color separation prism for three primary colors is depicted equivalently to a block 3.

The chromatic aberration correcting lens 2 is constructed in a cemented doublet form consisting of a negative lens LN and a positive lens LP of which the materials are different from each other with the cemented surface concave to the image side. Also, letting the refractive indices of the materials of the negative lens LN and the positive lens LP be denoted by NN and NP respectively, and the Abbe numbers of the materials of the negative lens LN and the positive lens LP by vN and vP respectively, their relationships are set forth as follows:

$NN \approx NP$
$vN > vP$

In such a manner, by using materials whose refractive indices are almost equal, but which are different only in Abbe number in the two elements of the cemented lens, a correction of the longitudinal chromatic aberration is made effective. Also, the first lens surface Ra and the last lens surface Rc of the chromatic aberration correcting lens 2', in this embodiment, are made flat for the purpose of simplicity and the cemented surface Rb is arranged to turn its concave curvature toward the image side. By this configuration, the chromatic variation of the spherical aberration can be corrected in good balance.

Besides this, in a numerical example 3 to be described later, ranges for the refractive indices NN and NP and the Abbe numbers υN and υP of the materials of the negative lens LN and the positive lens LP are set forth as follows:

NN > NP

υN > υP

When NN > NP is chosen, the cemented lens surface can be made to function as the negative refractive power and the spherical aberration can be over-corrected. This permits the lens to get an optical function like that which the parallel flat glass exerts when arranged in the converging light beam. Thus it is made possible to correct the spherical aberration in good balance.

It is to be understood that the use of the refractive index difference of the cemented lens makes it easier to well correct both of the spherical aberration and longitudinal chromatic aberration despite the reduction of the axial thickness of the lens system as shown in the numerical example 3 to be described later.

In this embodiment, on the assumption that the prism previously designed to be arranged on the image side of the photographic lens 1 has a thickness DL, then when another prism of different thickness DC from the thickness DL is used instead in shooting, letting the refractive indices of the materials of the positive lens LP and the negative lens LN be denoted by NP and NN respectively, and the axial thicknesses of the positive lens LP and the negative lens NP by DP and DN, respectively, a relationship for these thicknesses within the above-described feature for the refractive indices is set forth as follows:

When NP ≧ NN,

DP + DN ≧ DL − DC.

Or, when NP < NN,

DP + DN < DL − DC

When this condition is satisfied, the use of the chromatic aberration correcting lens on the image side of the photographic lens enables mainly the longitudinal chromatic aberration to be well corrected without causing the other various aberrations, particularly the spherical aberration, to deteriorate.

In other words, in the case of NP ≧ NN, because the cemented lens surface is concave toward the rear, it functions a the positive refractive power so that the spherical aberration becomes under-corrected. Therefore, the cemented lens may be formed to a larger overall axial thickness (DP + DN) than the thickness difference (DL − DC).

In the converse case of NP < NN, because the cemented lens surface functions as the negative refractive power, the spherical aberration becomes over-corrected. Therefore, the cemented lens may be formed to a smaller overall axial thickness (DP + DN) than the thickness difference (DL − DC).

It should be noted that in a case where the cemented lens surface is made to turn its convex curvature toward the image side, each element may be made up so that the above-described inequalities are retained identical.

This embodiment may be modified so that at least one of the first lens surface Ra and the last lens surface Rc of the chromatic aberration correcting lens is given a weak refractive power with an advantage of correcting the various aberrations to be produced from the cemented lens, or controlling the overall refractive power of the chromatic aberration correcting lens.

In the embodiments of the invention, the holder for the chromatic aberration correcting lens is constructed in a combined form with a flange focal distance alteration adapter having a lens side mount and a camera side mount, giving an advantage that though the adapter or intermediary is very convenient, the prism-corrected photographic lens can readily be applied to another prism through it.

Figure 10:
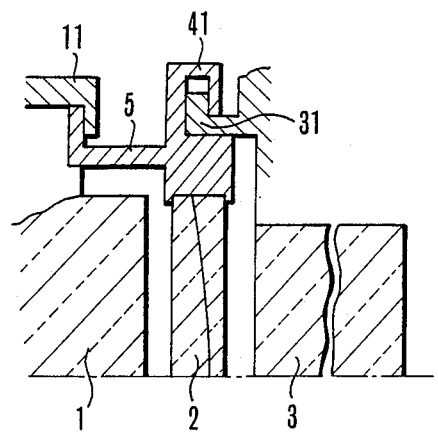
FIG. 10 is a fragmentary section view of a practical example of and application of the chromatic aberration correcting lens of the invention to a flange focal distance alteration adapter.

FIG. 10 is a fragmentary sectional view of a practical example of utilization of that alteration adapter as the holder. In the same figure, the flange focal distance alteration adapter 5 containing the chromatic aberration correcting lens 2' has a front mount to be coupled with a bayonet ring 11 of the photographic lens and a rear mount or bayonet ring 41 to be coupled with mount pawls 31 on the camera body.

A numerical example 3 of the FIG. 6 embodiment is shown in a table below for the radius of curvature Ri of the i-th lens surface counting from the front, the i-th lens thickness or air separation Di counting from the front, and the refractive index Ni and Abbe number υi of the material of the i-th lens element counting from the front.

| Numerical Example 3 | | | |
|---|---|---|---|
| F = 9.34 − 118 FNo = 1:1.6 − 1.7 | | | |
| R1 = −2337.70 | D1 = 2.50 | N1 = 1.80518 | υ1 = 25.4 |
| R2 = 107.51 | D2 = 3.84 | | |
| R3 = 330.35 | D3 = 8.40 | N2 = 1.43387 | υ2 = 95.1 |
| R4 = −123.70 | D4 = 0.15 | | |
| R5 = 181.98 | D5 = 8.36 | N3 = 1.49700 | υ3 = 81.6 |
| R6 = −158.76 | D6 = 0.15 | | |
| R7 = 52.34 | D7 = 10.76 | N4 = 1.69680 | υ4 = 55.5 |
| R8 = 237.88 | D8 = Variable | | |
| R9 = 61.10 | D9 = 1.00 | N5 = 1.88300 | υ5 = 40.8 |
| R10 = 18.77 | D10 = 3.80 | | |
| R11 = −63.98 | D11 = 0.80 | N6 = 1.80400 | υ6 = 46.6 |
| R12 = 82.33 | D12 = 3.76 | | |
| R13 = −16.14 | D13 = 0.80 | N7 = 1.77250 | υ7 = 49.6 |
| R14 = 307.48 | D14 = 3.20 | N8 = 1.92286 | υ8 = 21.3 |
| R15 = −28.88 | D15 = Variable | | |
| R16 = −26.20 | D16 = 0.90 | N9 = 1.77250 | υ9 = 49.6 |
| R17 = 29.28 | D17 = 3.70 | N10 = 1.80518 | υ10 = 25.4 |
| R18 = −786.13 | D18 = Variable | | |
| R19 = −160.22 | D19 = 3.88 | N11 = 1.58144 | υ11 = 40.7 |
| R20 = −35.70 | D20 = 0.15 | | |
| R21 = 82.00 | D21 = 10.11 | N12 = 1.56732 | υ12 = 42.8 |
| R22 = −21.90 | D22 = 1.20 | N13 = 1.88300 | υ13 = 40.8 |
| R23 = −73.59 | D23 = 14.87 | | |
| R24 = 65.40 | D24 = 9.55 | N14 = 1.51112 | υ14 = 60.5 |

-continued

Numerical Example 3

| | | | |
|---|---|---|---|
| R25 = −57.48 | D25 = 0.15 | | |
| R26 = −1739.44 | D26 = 1.20 | N15 = 1.88300 | ν15 = 40.8 |
| R27 = 37.25 | D27 = 10.97 | N16 = 1.50048 | ν16 = 65.9 |
| R28 = −64.96 | D28 = 0.15 | | |
| R29 = 10851.00 | D29 = 1.20 | N17 = 1.83400 | ν17 = 37.2 |
| R30 = 32.11 | D30 = 9.89 | N18 = 1.48749 | ν18 = 70.2 |
| R31 = −87.01 | D31 = 0.15 | | |
| R32 = 38.76 | D32 = 9.25 | N19 = 1.48749 | ν19 = 70.2 |
| R33 = 121.00 | D33 = 3.00 | | |
| R34 = ∞ | D34 = 2.00 | N20 = 1.72916 | ν20 = 54.7 |
| R35 = 450.00 | D35 = 3.00 | N21 = 1.72825 | ν21 = 28.5 |
| R36 = ∞ | D36 = 10.00 | | |
| R37 = ∞ | D37 = 60.00 | N22 = 1.57099 | ν22 = 50.8 |
| R38 = ∞ | | | |

Lens Separations during Zooming

| Focal Length | D8 | D15 | D18 |
|---|---|---|---|
| 9.3 | 0.6 | 44.39 | 5.24 |
| 118 | 44.14 | 2.71 | 3.38 |

Figure 7:
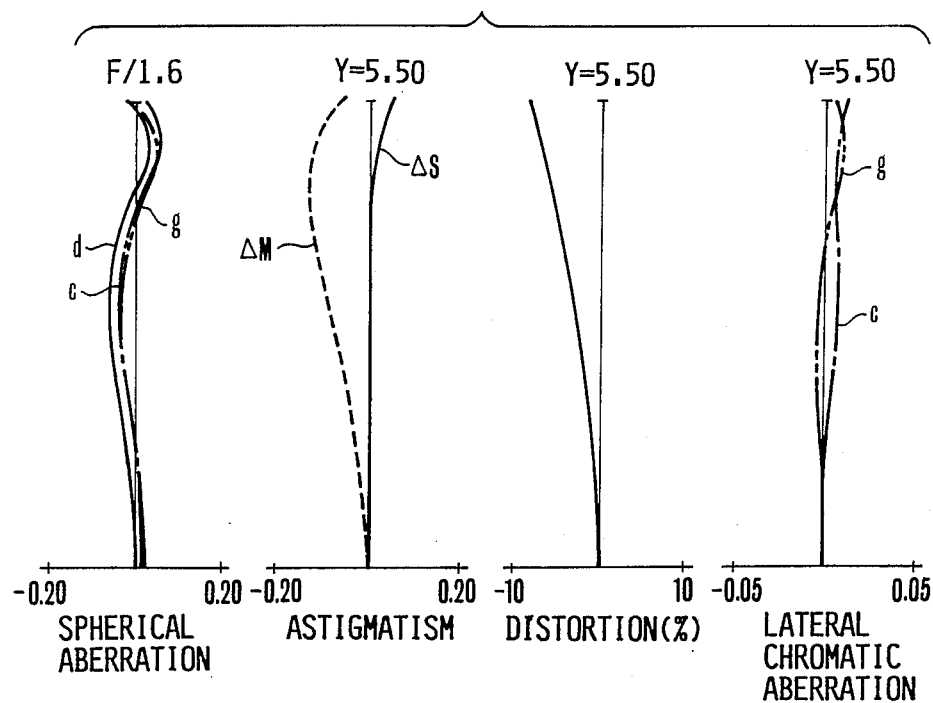
FIG. 7 comprises aberration curves of a numerical example 3 of the invention.

In the numerical example 3, R1 to R33 define a zoom lens designed with a BK-7, 65 mm thick prism on the image side. R34 to R36 define a chromatic aberration correcting lens according to the present embodiment. R37 to R38 are a block equivalent to a BaLF2, 60 mm thick prism. FIG. 7 is a graphic representation of the aberrations of the numerical example 3 in the wide angle end.

Figure 8:
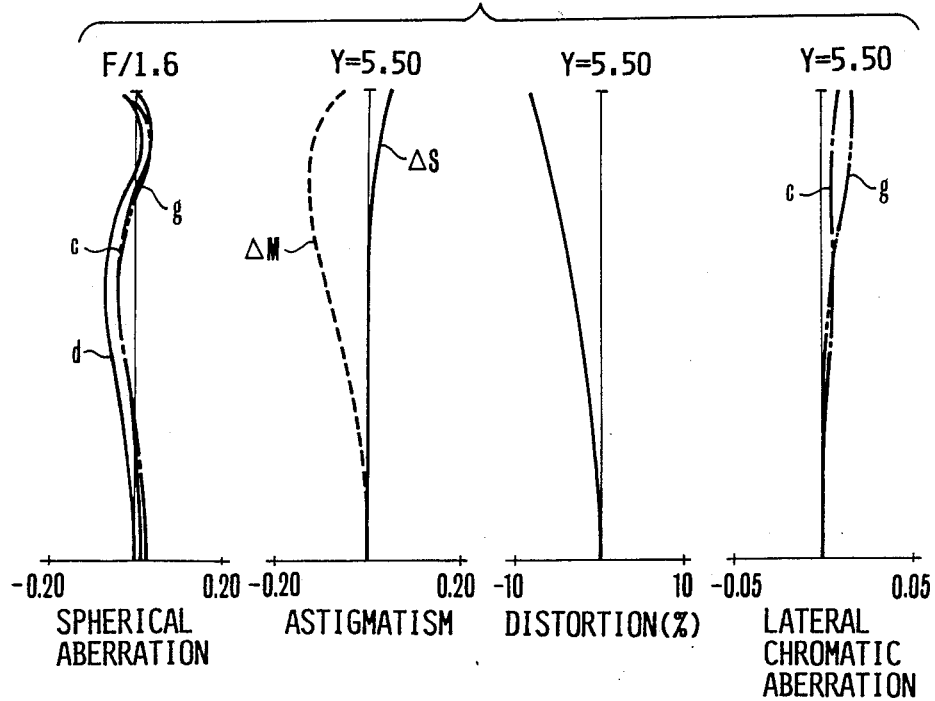
FIG. 8 comprises aberration curves of optics as obtained by having the zoom lens of the numerical example 3 associated with the original prism.

The aberrations of an optical system obtained by using the normal, or BK-7 65 mm thick prism for which the photographic lens is designed instead of the BaLF2 prism (R37 to R38) of the numerical example 3 are shown in FIG. 8.

As is evident from comparison of FIG. 7 with FIG. 8, despite the alteration of the material of the prism, if the chromatic aberration correcting lens of the invention is attached, the longitudinal chromatic aberration and the spherical aberration can be corrected well.

Another example 4 of the chromatic aberration correcting lens (R34 to R36) and the BaLF2, 60 mm thick prism (R37 and R38) to be arranged on the image side of the zoom lens of the numerical example 3 is shown below.

Numerical Example 4

| | | | |
|---|---|---|---|
| R34 = ∞ | D34 = 1.0 | N20 = 1.60311 | ν20 = 60.7 |
| R35 = 100.00 | D35 = 1.5 | N21 = 1.57099 | ν21 = 50.8 |
| R36 = ∞ | D36 = 10.0 | | |
| R37 = ∞ | D37 = 60.0 | N22 = 1.57099 | ν22 = 50.8 |
| R38 = ∞ | | | |

Figure 9:
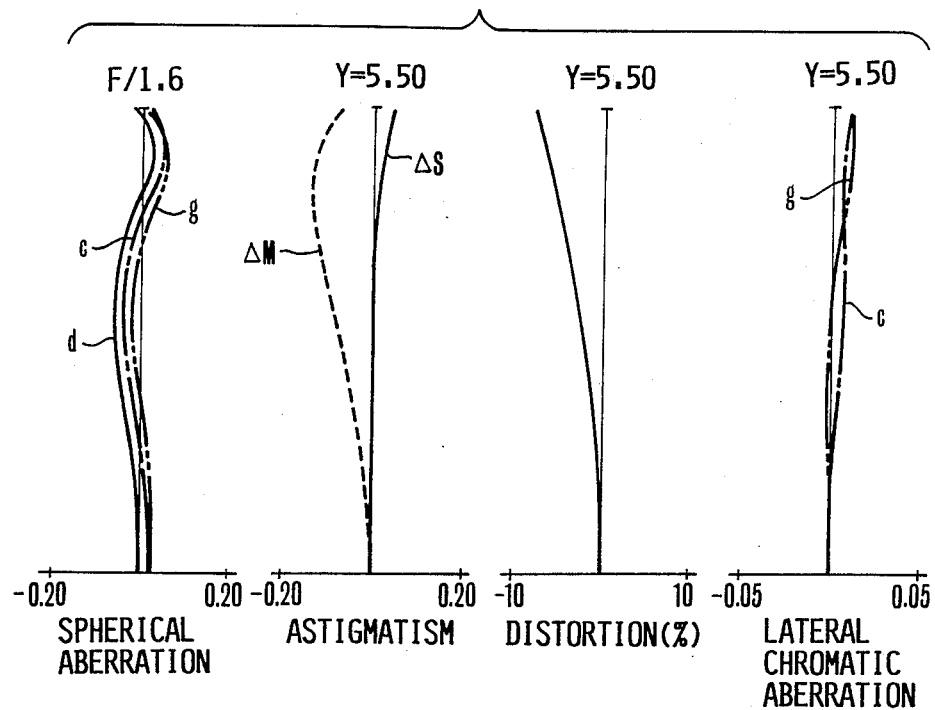
FIG. 9 comprises aberration curves of a numerical example 4 of optics as obtained by applying the invention to the zoom lens.

In this example, NN>NP, νN>νP. Since, in this condition, DP+DN=2.5 and DL−DC=5, the requirement DP+DN<DL−DC is fulfilled. Also, the cemented lens surface has a negative refractive power with the result of the over-correction of spherical aberration. FIG. 9 shows the aberrations of this example of the entire optical system.

What is claimed is:

1. An imaging performance correcting optical assembly arranged in between an image separation prism and a photographic lens, comprising:
   a plurality of lenses of which two adjacent lenses are made of different materials from each other, said plurality of lenses being cemented together such that each of the cemented surfaces is a concave surface facing the image side.

2. An optical assembly according to claim 1, wherein the number of said plurality of lenses cemented together is three, and wherein, where Abbe numbers of materials of said three lenses are denoted by νa, νb and νc in this order from the object side, and where radii of curvature of cemented surfaces of said three lenses are denoted by Rb and Rc in this order from the object side, the following conditions are satisfied:

$$\nu a < \nu b$$

$$\nu b < \nu c$$

$$|Rb| \geq |Rc|$$

3. An optical assembly according to claim 2, wherein refractive indices of materials of two of said three lenses are different from each other.

4. An optical assembly according to claim 2, wherein refractive indices of materials of said three lenses are equal to one another, and the Abbe numbers of said two adjacent lenses are different.

5. An optical assembly according to claim 1, wherein a first lens surface and a last lens surface of said optical assembly are flat surfaces.

6. An optical assembly according to claim 1, wherein at least one of a first lens surface and a last lens surface of said optical assembly is a spherical surface.

7. An imaging performance correcting optical assembly arranged in between an image separation of prism and a photographic lens, comprising:
   two lenses including a negative lens and a positive lens cemented together to form a cemented lens having a cemented surface which is a concave surface facing an image side, and satisfying one of the following conditions:

when NP≧NN, DP+DN≧DL−Dc, or
   when NP<NN, DP+DN<DL−DC,
   where NN and NP are refractive indices of materials of said negative lens and said positive lens, respectively, DN and DP are axial thicknesses of said negative lens and said positive lens, respectively, and DL and DC are thicknesses of a predetermined prism presumed for designing the photographic lens and a prism actually in use in the assembly, respectively.

8. A color video system, comprising:
   a first color decomposing prism for decomposing incident polychromatic light into a plurality of different color lights;
   a photographing lens compensated in chromatic aberration relative to said first color decomposing prism;
   a second color decomposing prism for decomposing incident polychromatic light into a plurality of different color lights, having an optical path length different from said first color decomposing prism; and
   an optical assembly inserted between said photographing lens and said second color decomposing prism when said lens and prism are used in combination for compensating the chromatic aberration of said photographing lens to restrict the chromatic aberration of a light beam passing through said second prism.

9. A color video system according to claim 8, wherein said light beam passing through said second color decomposing prism is restricted in its axial chromatic aberration.

10. A color video system according to claim 8, wherein said photographing lens comprises a substantially telecentric zoom lens.

11. A color video system according to claim 8, wherein said second color decomposing prism is located at a fixed distance with respect to a light receiving surface of a solid-state image pick-up element.

12. A color video system according to claim 8, wherein said optical assembly has a plurality of optical elements each having a different Abbe number relative to adjacent elements.

13. A photographic system for a color video camera, comprising:
  a photographing lens compensated in chromatic aberration relative to a first color decomposing prism which decomposes an incident polychromatic light into a plurality of different color lights; and
  an optical assembly for compensating the chromatic aberration of said photographing lens to restrict an axial chromatic aberration of a light beam passing through a second color decomposing prism, said optical assembly being arranged between said photographing lens and the second prism when said photographing lens and the second prism are used in combination, the second prism having an optical path length different from that of the first prism and decomposing an incident polychromatic light into a plurality of different color lights.

14. A photographic system according to claim 13, wherein said second color decomposing prism is located with a fixed distance to a light receiving surface of a solid-state image pick-up element.

15. A photographic system according to claim 13, wherein said optical assembly has a plurality of optical elements having a different Abbe number relative to an adjacent element.

* * * * *

UNITED STATES PATENT AND TRADEMARK OFFICE
CERTIFICATE OF CORRECTION

PATENT NO. : 4,976,526

DATED : December 11, 1990

INVENTOR(S) : Shigeru OSHIMA ET AL.

It is certified that error appears in the above-identified patent and that said Letters Patent is hereby corrected as shown below:

COLUMN 1:

Line 40, "catalogue," should read --catalogue, and--.

COLUMN 3:

Line 10, "of and" should read --of the--.

COLUMN 5:

Line 49, "N10=1.92286 v10=21.3" should read --N10=1.80518 v10=25.4.

COLUMN 10:

Line 10, "va < vb" should read --va > vb --.

COLUMN 12:

Line 18, "elements" should read --elements each--.

Signed and Sealed this

Twenty-eighth Day of July, 1992

*Attest:*

DOUGLAS B. COMER

*Attesting Officer*      *Acting Commissioner of Patents and Trademarks*